United States Patent
Hall et al.

(10) Patent No.: US 11,533,557 B2
(45) Date of Patent: Dec. 20, 2022

(54) RIDE VEHICLE WITH DIRECTIONAL SPEAKERS AND HAPTIC DEVICES

(71) Applicant: Universal City Studios LLC, Universal City, CA (US)

(72) Inventors: Gregory S. Hall, Orlando, FL (US); Corrie Pickering, Peachtree City, GA (US)

(73) Assignee: Universal City Studios LLC, Universal City, CA (US)

( * ) Notice: Subject to any disclaimer, the term of this patent is extended or adjusted under 35 U.S.C. 154(b) by 938 days.

(21) Appl. No.: 16/366,642

(22) Filed: Mar. 27, 2019

(65) Prior Publication Data

US 2020/0236461 A1 Jul. 23, 2020

Related U.S. Application Data

(60) Provisional application No. 62/795,398, filed on Jan. 22, 2019.

(51) Int. Cl.
*H04R 1/32* (2006.01)
*A63G 21/04* (2006.01)
*G06F 3/01* (2006.01)

(52) U.S. Cl.
CPC ............. *H04R 1/323* (2013.01); *A63G 21/04* (2013.01); *G06F 3/016* (2013.01); *H04R 2499/13* (2013.01)

(58) Field of Classification Search
CPC .... H04R 1/323; H04R 2499/13; A63G 21/04; G06F 3/016
See application file for complete search history.

(56) References Cited

U.S. PATENT DOCUMENTS

| 5,490,784 | A | 2/1996 | Carmein |
| 5,784,473 | A * | 7/1998 | Ferren ................... A63J 5/00 381/337 |
| 6,179,619 | B1 | 1/2001 | Tanaka |
| 8,686,941 | B2 | 4/2014 | Rank |
| 10,457,179 | B1 * | 10/2019 | Kentley-Klay ........ B60N 2/879 |

(Continued)

FOREIGN PATENT DOCUMENTS

| CN | 101090760 A | 12/2007 |
| KR | 200330317 Y1 | 10/2003 |

(Continued)

OTHER PUBLICATIONS

PCT/US2020/013292 International Search Report and Written Opinion dated Apr. 17, 2020.

*Primary Examiner* — Jason R Kurr
(74) *Attorney, Agent, or Firm* — Fletcher Yoder, P.C.

(57) ABSTRACT

Systems and methods are disclosed that provide directional speakers and haptic devices for each guest of a ride vehicle. A controller may receive a vehicle location, seat location data, input audio data, and input haptic data. The seat location data may include a guest's seat location in the ride vehicle and/or the guest's preferences (e.g., a preferred language, volume preferences, or content rating preference). The controller may generate different audio output signals corresponding to different guests based on the input audio data, the vehicle location, and/or the seat location data, and generate different haptic output signals corresponding to different guests based on the input haptic data, the vehicle location, and/or the seat location data. The controller may then instruct directional speaker directed at the seat locations of the different guests to output the different audio output signals and instruct haptic devices directed at the seat locations to output the different haptic output signals.

20 Claims, 4 Drawing Sheets

(56) References Cited

U.S. PATENT DOCUMENTS

| | | |
|---|---|---|
| 2003/0068053 A1 | 4/2003 | Chu |
| 2006/0262935 A1* | 11/2006 | Goose ..................... H04S 3/002 |
| | | 381/17 |
| 2007/0211574 A1 | 9/2007 | Croft, III |
| 2008/0054561 A1 | 3/2008 | Canterbury et al. |
| 2009/0226000 A1 | 9/2009 | Kadar |
| 2009/0312096 A1 | 12/2009 | Kane et al. |
| 2010/0061571 A1 | 3/2010 | Choi et al. |
| 2010/0130296 A1 | 5/2010 | Ackley et al. |
| 2012/0283939 A1 | 11/2012 | Bobbitt, III |
| 2012/0306631 A1 | 12/2012 | Hughes |
| 2013/0032053 A1 | 2/2013 | Stoker |
| 2014/0270321 A1 | 9/2014 | Fullam |
| 2015/0123774 A1 | 5/2015 | Ioffreda et al. |
| 2015/0193196 A1* | 7/2015 | Lin ..................... G06F 3/04842 |
| | | 715/716 |
| 2016/0059145 A1 | 3/2016 | Cortelyou et al. |
| 2016/0269822 A1 | 9/2016 | Gorial et al. |
| 2017/0072316 A1 | 3/2017 | Finfter |
| 2017/0116977 A1 | 4/2017 | Logan |
| 2018/0104578 A1 | 4/2018 | Travis et al. |
| 2018/0186286 A1* | 7/2018 | Groh ..................... B60Q 9/008 |
| 2018/0334098 A1* | 11/2018 | Pouliquen .............. G08G 1/168 |
| 2019/0300020 A1* | 10/2019 | Alexiou ................. B60N 2/879 |
| 2019/0337551 A1* | 11/2019 | Carpentier ........ B60R 21/21656 |
| 2020/0086892 A1* | 3/2020 | Alequin .................. B60Q 9/00 |

FOREIGN PATENT DOCUMENTS

| | | |
|---|---|---|
| KR | 20140079582 A | 6/2014 |
| KR | 20160025731 A | 3/2016 |
| WO | 9700106 A1 | 1/1997 |

\* cited by examiner

RIDE VEHICLE WITH DIRECTIONAL SPEAKERS AND HAPTIC DEVICES

CROSS REFERENCE TO RELATED APPLICATIONS

This application claims priority from and the benefit of U.S. Provisional Application Ser. No. 62/795,398, entitled "RIDE VEHICLE WITH DIRECTIONAL SPEAKERS AND HAPTIC DEVICES," filed Jan. 22, 2019, which is hereby incorporated by reference in its entirety for all purposes.

BACKGROUND

The present disclosure relates generally to ride vehicles, such as those that are used in attractions at a theme park. More specifically, embodiments of the present disclosure relate to equipping ride vehicles with directional speakers and haptic devices to provide an immersive environment.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Certain attractions at theme parks may include sound effects. That is, as a ride vehicle of an attraction enters a room of the attraction, speakers in the room may output sound associated with objects in the room. For example, if the room includes an animatronic lion, when the ride vehicle enters the room, the speakers may output a sound simulating a lion's roar.

However, it is now recognized that the sound outputted by the speakers in the room may not be customized for different guests in the ride vehicle. Moreover, providing only sound and visual stimuli may not be sufficient to provide an immersive environment.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In one embodiment, a ride vehicle system includes a ride vehicle having seats, directional speakers, haptic devices, audio adjustment logic, and haptic adjustment logic. Each directional speaker outputs an audio output signal at a respective seat, and each set of haptic devices outputs a haptic output signal at the respective seat. The ride vehicle system includes a control system having audio adjustment logic that generates the audio output signal based on input audio data, a vehicle location, and/or seat location data associated with the respective seat. The control system also has haptic adjustment logic that generates the haptic output signal based on input haptic data, the vehicle location, and/or the seat location data. The control system further has a controller communicatively coupled to the audio adjustment logic and the haptic adjustment logic. The controller includes a processor and a memory device. The processor instructs the audio adjustment logic to generate the audio output signals and instructs the haptic adjustment logic to generate the haptic output signals. The processor also outputs the audio output signals to the directional speakers and outputs the haptic output signals to the haptic devices.

In another embodiment, a control system includes audio adjustment logic that generates audio output signals corresponding to different guests based on audio adjustment data that includes input audio data, a vehicle location of a ride vehicle, and/or seat location data associated with seats of the ride vehicle. The control system also includes haptic adjustment logic that generates haptic output signals corresponding to different guests based on haptic adjustment data that includes input haptic data, the vehicle location, and/or the seat location data. The control system further includes a controller having a processor and a memory device. The processor receives the audio adjustment data and the haptic adjustment data. The processor also instructs the audio adjustment logic to generate the audio output signals based on the audio adjustment data and instructs the haptic adjustment logic to generate the haptic output signals based on the haptic adjustment data. The processor further outputs the audio output signals to directional speakers directed at the seats of the ride vehicle and outputs the haptic output signals to haptic devices directed at the seats of the ride vehicle.

In yet another embodiment, a method for providing an immersive ride vehicle environment includes receiving audio data, haptic data, and at least one of a vehicle location of a ride vehicle and seat location data associated with seats of the ride vehicle. The method also includes generating audio output signals corresponding to different guests based on the audio data and one or both of the vehicle location and the seat location data. The method further includes generating haptic output signals corresponding to different guests based on the haptic data and one or both of the vehicle location and the seat location data. The method also includes outputting the audio output signals to directional speakers of the ride vehicle directed at the seats and outputting the haptic output signals to haptic devices of the ride vehicle directed at the seats.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

The present disclosure provides ride vehicles with directional speakers and haptic devices to provide an immersive environment. In particular, certain attractions at theme parks may include sound effects. That is, as a ride vehicle of an attraction enters a room of the attraction, speakers in the room may output sound associated with objects in the room. For example, if the room includes an animatronic lion, when the ride vehicle enters the room, the speakers may output a sound simulating a lion's roar. However, the sound outputted by the speakers in the room may not be customized for different guests in the ride vehicle. Moreover, providing only sound and visual stimuli may not be sufficient to provide an immersive environment.

As such, the presently disclosed systems and methods provide directional speakers and/or haptic devices (e.g., for one or more guests of a ride vehicle). A controller may receive a vehicle location, seat location data, input audio data, and input haptic data. The seat location data may include a guest's seat location in the ride vehicle and/or the guest's preferences (e.g., a preferred language, volume preferences, and/or content rating preference). The controller may generate different audio output signals corresponding to different guests based on the input audio data, the vehicle location, and/or the seat location data, and generate different haptic output signals corresponding to different guests based on the input haptic data, the vehicle location, and/or the seat location data. The controller may then instruct directional speakers directed at seat locations of the different guests to output the different audio output signal and instruct haptic devices directed at the seat locations to output the different haptic output signals. Each directional speaker and/or haptic device directed at a respective guest seated in a respective seat of the ride vehicle may provide customized audio (e.g., a different audio output signal) and/or a customized haptic experience (e.g., a different haptic output) to the respective guest. Thus, each guest may have a personalized experience that is different from another guest's experience in the same ride vehicle during the ride through the attraction. Moreover, the directional speakers and/or the haptic devices may provide a more immersive environment.

Figure 1:
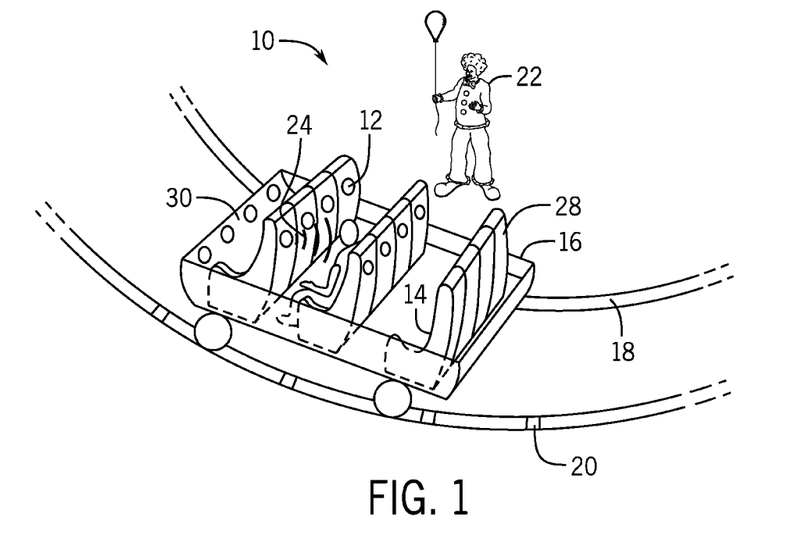
FIG. 1 is a side perspective diagram of a ride vehicle system having directional speakers and haptic devices, according to embodiments of the present disclosure.
Figure 2:
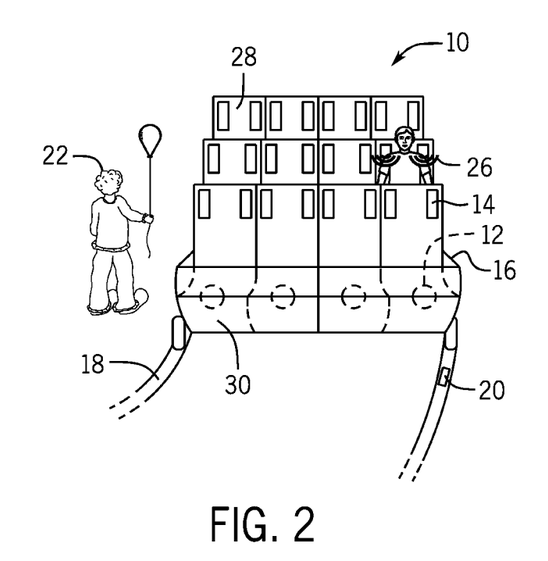
FIG. 2 is a front perspective diagram of the ride vehicle system of FIG. 1 having directional speakers and haptic devices, according to embodiments of the present disclosure.

With this in mind, FIGS. 1 and 2 are perspective diagrams of a ride vehicle system 10 having directional speakers 12 and haptic devices 14, according to embodiments of the present disclosure. As illustrated, a ride vehicle 16 travels on a path 18 (e.g., track) of an attraction of a theme park. The path 18 may include vehicle location sensors 20, which may be communicatively coupled to a controller and send indications of the location of the ride vehicle 16 to the controller. While the present disclosure illustrates the vehicle location sensors 20 disposed on the path 18, it should be understood that the vehicle location sensors 20 may be disposed at any suitable location, such as on the ride vehicle 16 or in the room of the attraction. Furthermore, vehicle location data may be obtained in other ways, such as based on timing of the ride or attraction (e.g., a ride start signal may be sent or received at a beginning of the ride or attraction, and the vehicle location data may be estimated based on a known duration of the ride or attraction). In one embodiment, the controller may send audio and haptic input data to the directional speakers 12 and haptic devices 14 of the ride vehicle 16 in response to receiving an indication that the ride vehicle 16 is at a target location. While the embodiments of the present disclosure include a ride vehicle 16 on a path 18, it should be understood that the disclosed techniques may be applied to any suitable attraction or entertainment apparatus, including a stationary compartment (e.g., not on a path or track) that includes displays and/or effects that change around the stationary compartment (e.g., provide the illusion of movement) via, for example, augmented reality or virtual reality effects.)

For example, as illustrated, the attraction includes an object of interest 22 (e.g., a physical or virtual object, such as an animatronic character or displayed character). As illustrated, the object of interest 22 may be a clown. The object of interest 22 may be associated with certain sounds (e.g., laughter) to be outputted when the guests are within a certain distance from the object of interest 22. Specifically, when the vehicle location sensors 20 indicate that the ride vehicle 16 is within the certain distance from the object of interest 22, the controller may instruct the directional speakers 12 to output an audio output signal 24 associated with the certain sounds. The object of interest 22 may also be associated with a certain haptic output (e.g., application of force, vibration, and/or motion) to be outputted when the guests are within a certain distance from the object of interest 22. When the vehicle location sensors 20 indicate that the ride vehicle 16 is within the certain distance from the object of interest 22, the controller may instruct the haptic devices 14 to output a haptic output signal 26 associated with the certain haptic output. The directional speakers 12 and/or the haptic devices 14 may be disposed in seats 28 of the ride vehicle 16, a front portion 30 of the ride vehicle 16, or any other suitable part of the ride vehicle 16 or location. For example, the directional speakers 12 may be mounted in front of each seat (e.g., facing a guest) and the haptic devices 14 may be in or near a headrest of the seat 28 (e.g., behind or next to a head or upper body of the guest). In some embodiments, the directional speakers 12 and/or the haptic devices 14 may be coupled to or part of passenger restraints or lap bars of the ride vehicle 16.

Each directional speaker 12 may use any suitable technique to output audible sound to a guest disposed in a first seat 28, such that guests in neighboring seats may not be able to hear the audible sound. That is, the directional speakers 12 may create fields of sound which spread less than traditional loudspeakers. In one embodiment, the directional speakers 12 may include ultrasonic devices that achieve high directivity by modulating audible sound onto high frequency ultrasound. The higher frequency sound waves have shorter wavelengths, and thus may not spread out as rapidly as sound waves produced by traditional loudspeakers. As such, the directional speakers 12 may have higher directivity, and may be used to output audible sound to a guest without neighboring guests hearing the audible sound.

Figure 3:
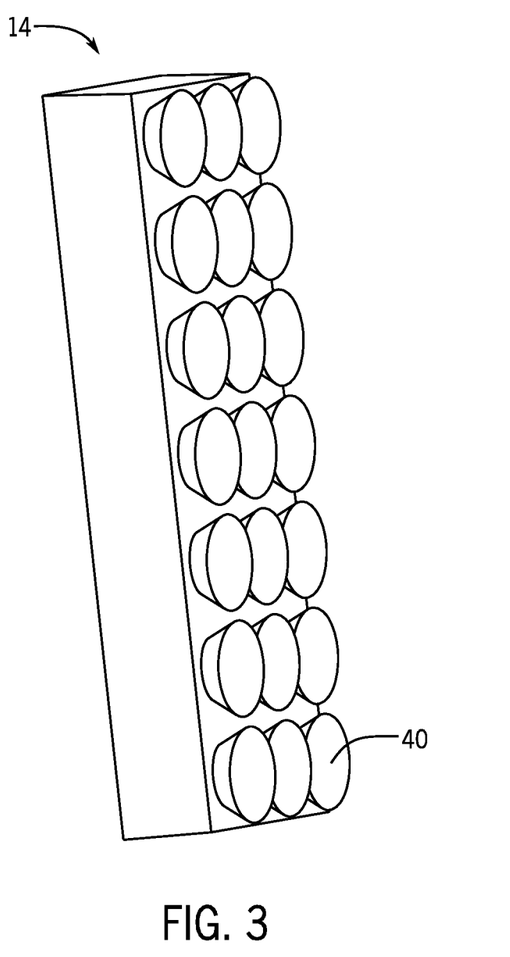
FIG. 3 is an example haptic device of the ride vehicle system of FIG. 1, according to embodiments of the present disclosure.

FIG. 3 is an example haptic device 14 of the ride vehicle system 10, according to embodiments of the present disclosure. In one embodiment, the haptic device 14 may cause haptic feedback by recreating the sense of touch to the guest by applying forces, vibrations, and/or motions to the guest. As illustrated, the haptic device 14 may include multiple output components 40 that cause the haptic feedback (via contact or non-contact technology). The output components 40 may include actuators or motors that cause vibration, such as rotating actuators (e.g., eccentric rotating mass actuators), linear actuators (e.g., linear resonant actuators), piezoelectric actuators, and/or motors that manipulate movement of a seat of the ride vehicle 16. The output components 40 may include air vortex rings that produce concentrated gusts of air. The output components 40 may include ultrasound speakers that make changes in air pressure near the guest, causing the guest to feel pockets of pressurized air.

Moreover, the output components 40 may include directable water jets that spray water at the guest. The output components 40 may include heaters or chillers/coolers that cause the guest to feel heat or cold. In any case, the output components 40 may simulate touch, movement, wind, rain, heat, and/or cold, to the guest. It should be understood that the disclosed output components 40 are examples, and any suitable output components 40 or combination of output components 40 that may cause haptic feedback to the guest are contemplated. Additionally, the haptic device 14 may be located in any suitable location, such as on the seats 28, on the floor of the ride vehicle 16, on the sides of the ride vehicle 16, or the like.

Figure 4:
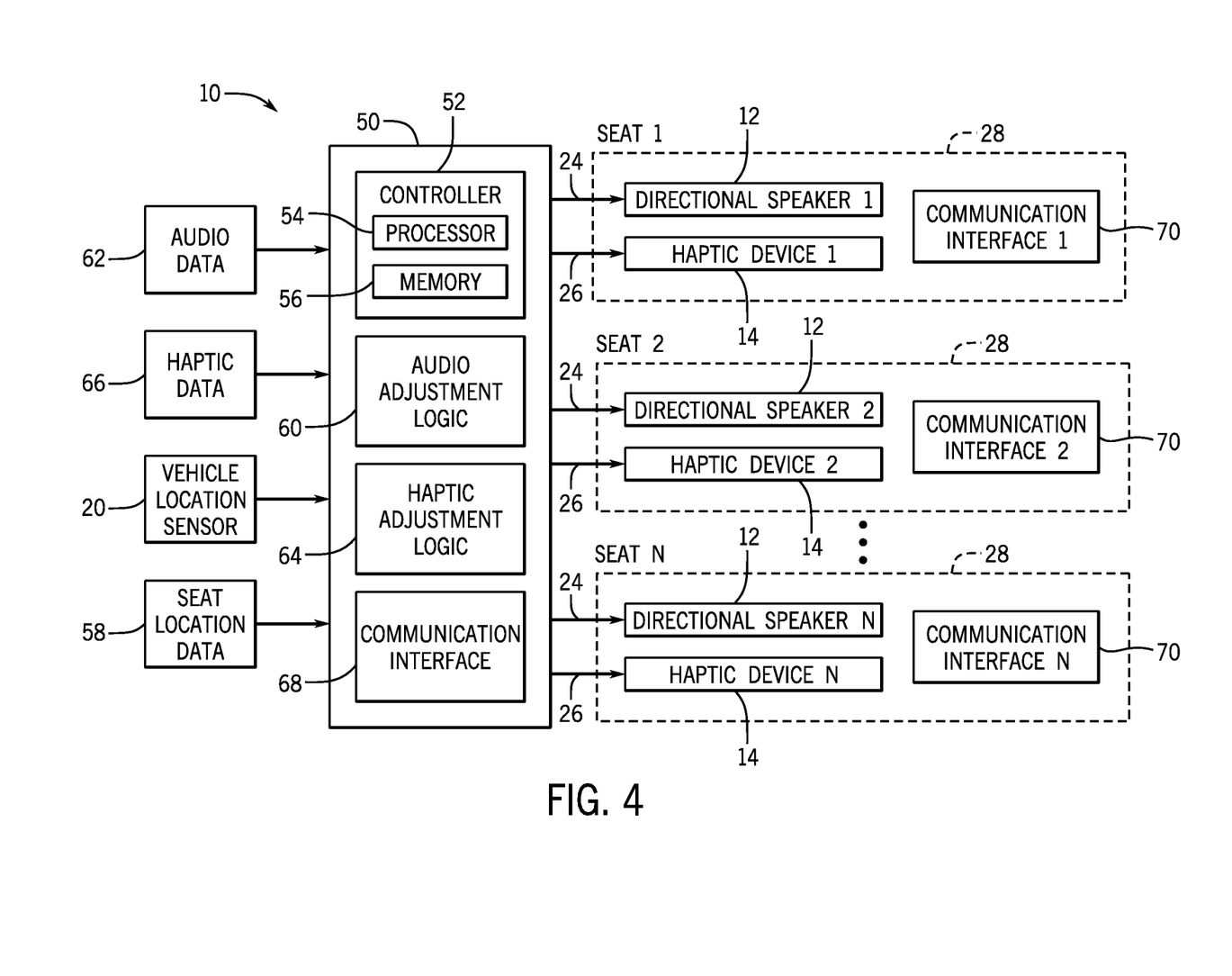
FIG. 4 is a block diagram of the ride vehicle system of FIG. 1, according to embodiments of the present disclosure.

FIG. 4 is a block diagram of the ride vehicle system 10, according to embodiments of the present disclosure. As illustrated, the ride vehicle system 10 includes a sensory output control system 50 having a controller 52 (e.g., electronic controller). The sensory output control system 50 may include any suitable computing device that receives input information and outputs audio and/or haptic output signals, including a server, desktop computer, laptop computer, tablet, smartphone, a wearable device, and/or the like. The controller 52 includes one or more processors 54 and one or more memory devices 56 (which may include one or more storage devices). The processor 54 may execute software programs and/or instructions to output audio output signals 24 and/or haptic output signals 26 based on a vehicle location and/or seat location data 58, thereby providing a personalized experience and coordinating the audio and haptic effects with ride effects in the ride environment (e.g., the object of interest 22). Moreover, the processor 54 may include multiple microprocessors, one or more "general-purpose" microprocessors, one or more special-purpose microprocessors, one or more application specific integrated circuits (ASICS), and/or one or more reduced instruction set (RISC) processors. The memory device 56 may store machine-readable and/or processor-executable instructions (e.g., firmware or software) for the processor 54 to execute, such as instructions relating to outputting audio output signals 24 and/or haptic output signals 26 based on a vehicle location and/or seat location data 58. As such, the memory device 56 may store, for example, control software, look up tables, configuration data, and so forth, to facilitate providing appropriate audio and/or haptic effects for each guest. In one embodiment, the processor 54 and the memory device 56 may be external to the controller 52. The memory device 56 may include a tangible, non-transitory, machine-readable-medium, such as a volatile memory (e.g., a random access memory (RAM)) and/or a nonvolatile memory (e.g., a read-only memory (ROM), flash memory, hard drive, and/or any other suitable optical, magnetic, or solid-state storage medium).

As illustrated, the controller 52 is communicatively coupled to (or may include) audio adjustment logic 60. It should be understood that the term "logic," as used in the present disclosure, may include hardware (such as circuitry), software (such as instructions for execution by a processor), or a combination of the two. The audio adjustment logic 60 may receive audio adjustment data that includes input audio data 62, vehicle location and/or seat location data 58, and may adjust the input audio data 62 based on the vehicle location and/or the seat location data 58. The input audio data 62 may be associated with the object of interest 22, and may be intended to be output to the guests when they are within a threshold distance (e.g., a hearing distance) of the object of interest 22. For example, the audio data 62 may simulate sounds made by the object of interest 22 (e.g., laughing, crying, shouting, stepping, shuffling, or any other suitable vocalization or movement) or sounds accompanying the object of interest 22 (e.g., music, sound effects, or any other suitable ambient noise). In particular, the vehicle location sensor 20 may send an indication of the vehicle location to the controller 52. The controller 52 may instruct the audio adjustment logic 60 to adjust the input audio data 62 based on the vehicle location. For example, as the vehicle location sensors 20 indicate that the ride vehicle 16 is nearing or getting closer to the object of interest 22, the controller 52 may instruct the audio adjustment logic 60 to increase the volume associated with the input audio data 62. As the vehicle location sensors 20 indicate that the ride vehicle 16 is getting further from the object of interest 22, the controller 52 may instruct the audio adjustment logic 60 to decrease the volume associated with the input audio data 62. That is, the controller 52 may instruct the audio adjustment logic 60 to adjust the input audio data 62 to simulate that the object of interest 22 is making a sound. The controller 52 may then generate an audio output signal 24 based on the adjusted audio data, and send the audio output signal 24 to the directional speaker 12.

The controller 52 may additionally or alternatively receive seat location data 58. The seat location data 58 may include a guest's seat location 28 in the ride vehicle 16, as well as the guest's preferences. The guest preferences may be stored in any suitable memory or storage device, such as the memory 56 or a storage device external to the controller 52 and/or the sensory output control system 50. In one embodiment, the guest preferences may be set or configured (e.g., by the guest) at the attraction (e.g., at a console prior to getting in the ride vehicle 16 or while in the ride vehicle 16) and/or via a mobile device (e.g., of the guest).

As an example, the guest's preferences may include a preferred language (or a nationality of the guest), volume level, and/or content rating (or an age of the guest). The controller 52 may instruct the audio adjustment logic 60 to adjust the input audio data 62 based on the seat location data 58. For example, if the seat location data 58 indicates that the guest's seat location 28 is further away from the object of interest 22 than other seats in a row of seats, the controller 52 may instruct the audio adjustment logic 60 to decrease the volume associated with the input audio data 62. Similarly, if the seat location data 58 indicates that the guest's seat location 28 is closer to the object of interest 22 than other seats in a row of seats, the controller 52 may instruct the audio adjustment logic 60 to increase the volume associated with the input audio data 62. As another example, the input audio data 62 may include multiple streams of audio data corresponding to different languages. If the seat location data 58 indicates a preferred language for the guest, the controller 52 may instruct the audio adjustment logic 60 to select the stream of audio data corresponding to the preferred language. As yet another example, if the seat location data 58 indicates a preferred volume level for the guest, the controller 52 may instruct the audio adjustment logic 60 to adjust the volume level associated with the input audio data 62 corresponding to the preferred volume level. In another example, the input audio data 62 may include multiple streams of audio data corresponding to different content ratings or maturity levels. If the seat location data 58 indicates a preferred content rating for the guest, the controller 52 may instruct the audio adjustment logic 60 to select the stream of audio data corresponding to the preferred content rating. The controller 52 may then generate an audio output signal 24 based on the adjusted audio data, and send the audio output signal 24 to the directional speaker 12.

As illustrated, the controller 52 is also communicatively coupled to (or may include) haptic adjustment logic 64. The haptic adjustment logic 64 may receive haptic adjustment data that includes input haptic data 66, vehicle location and/or seat location data 58, and may adjust the input haptic data 66 based on the vehicle location and/or the seat location data 58. The input haptic data 66 may be associated with the object of interest 22, and may be intended to be output to the guests when they are within a threshold distance of the object of interest 22. In particular, the vehicle location sensor 20 may send an indication of the vehicle location to the controller 52. The controller 52 may instruct the haptic adjustment logic 64 to adjust the input haptic data 66 based on the vehicle location. For example, as the vehicle location sensors 20 indicate that the ride vehicle 16 is nearing or getting closer to the object of interest 22, the controller 52 may instruct the haptic adjustment logic 64 to increase a haptic output associated with the input haptic data 66. As the vehicle location sensors 20 indicate that the ride vehicle 16 is getting further from the object of interest 22, the controller 52 may instruct the haptic adjustment logic 64 to decrease the haptic output associated with the input haptic data 66. That is, the controller 52 may instruct the haptic adjustment logic 64 to adjust the input haptic data 66 to simulate that the object of interest 22 is the cause of the haptic output. The haptic output may include any suitable output associated with the components 40 of the haptic device 14, such as outputting forces, vibrations, motions, air, water, heat, and/or cold. The controller 52 may then generate a haptic output signal 26 based on the adjusted haptic data, and send the haptic output signal 26 to the haptic device 14.

The controller 52 may additionally or alternatively instruct the haptic adjustment logic 64 to adjust the input haptic data 66 based on the seat location data 58. For example, if the seat location data 58 indicates that the guest's seat location 28 is further away from the object of interest 22 than other seats in a row of seats, the controller 52 may instruct the haptic adjustment logic 64 to decrease the haptic output associated with the input haptic data 66. Similarly, if the seat location data 58 indicates that the guest's seat location 28 is closer to the object of interest 22 than other seats in a row of seats, the controller 52 may instruct the haptic adjustment logic 64 to increase the haptic output of the input haptic data 66. In one embodiment, if the seat location data 58 indicates that the guest's seat location 28 is further away from the object of interest 22 than other seats in a row of seats, the controller 52 may instruct the haptic adjustment logic 64 to adjust the timing of the haptic output such that the haptic output occurs after haptic output of the other seats closer to the object of interest 22. Similarly, if the seat location data 58 indicates that the guest's seat location 28 is closer to the object of interest 22 than other seats in a row of seats, the controller 52 may instruct the haptic adjustment logic 64 to adjust the timing of the haptic output such that the haptic output occurs before haptic output of the other seats further from the object of interest 22. As another example, the seat location data 58 may include a preferred haptic level (e.g., less intense or more intense) for the guest, and the controller 52 may instruct the haptic adjustment logic 64 to adjust the haptic output associated with the input haptic data 66 to match the preferred haptic level. In yet another example, the seat location data 58 may include a preferred content rating for the guest, and the controller 52 may instruct the haptic adjustment logic 64 to adjust the haptic output associated with the input haptic data 66 to correspond to the preferred content rating. For example, if the guest is a child, the preferred content rating may correspond to the child's age or maturity level, and the controller 52 may instruct the haptic adjustment logic 64 to decrease the haptic output associated with the input haptic data 66 to decrease the intensity of the haptic output. The controller 52 may then send the haptic output signal 26 to the haptic device 14.

The controller 52 is also communicatively coupled to a communication interface 68 that enables the sensory output control system 50 to send and receive information to and from other components of the ride vehicle system 10. For example, the communication interface 68 may enable the sensory output control system 50 to receive the audio data 62, the haptic data 66, the vehicle location (e.g., from the vehicle location sensor 20), and/or the seat location data 58. The communication interface 68 may also enable the sensory output control system 50 to send audio output signals 24 to directional speakers 12 and/or haptic output signals 26 to haptic devices 14. That is, the ride vehicle 16 may include multiple seats 28, each having directional speakers 12 corresponding to the seats 28, haptic devices 14 corresponding to the seats 28, and communication interfaces 70. The communication interfaces 70 of the seats 28 may receive the audio output signals and/or haptic output signals 26, which may then be output by the directional speakers 12 and/or the haptic devices 14. The communication interfaces 68, 70 may enable communication via wired and/or wireless components or techniques via any suitable communication protocol. For example, the communication interfaces 68, 70 may enable communication via a wireless network, such as a mobile network, WiFi, LAN, WAN, Internet, and/or the like.

As illustrated, the controller 52 may independently adjust multiple input audio data signals 62 via the audio adjustment logic 60 and/or multiple input haptic data signals 66 via the haptic adjustment logic 64 corresponding to multiple seats 28 of the ride vehicle 16. That is, the controller 52 may adjust each input audio data signal 62 via the audio adjustment logic 60 and/or each input haptic data signal 66 via the haptic adjustment logic 64 on a case-by-case basis, such that each resulting audio output signal 24 and/or each resulting haptic output signal 26 varies. Thus, each guest may experience personalized audio and/or haptic effects during the ride. For example, a first guest may hear a sound with a first set of characteristics (e.g., language or volume level) and/or feel a haptic effect (e.g., a concentrated gust of air) at a first time, while a second guest may hear a different sound with a second set of characteristics (e.g., language or volume level) and/or feel a different haptic effect (e.g., a vibration) at the first time. As another example, the first guest may hear a sound with a first set of characteristics and/or feel a haptic effect at a first time, while a second guest may hear the same sound with a second set of characteristics and/or feel the same haptic effect at a second time.

Figure 5:
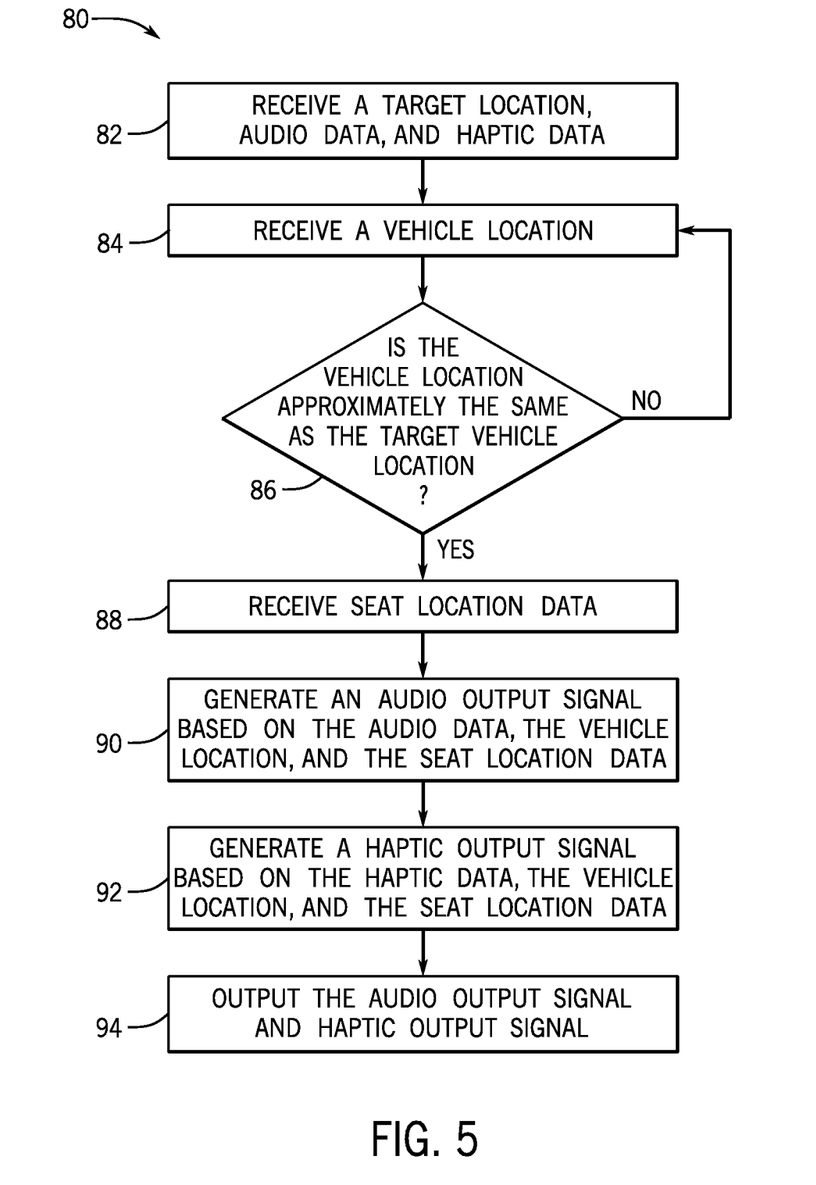
FIG. 5 is a flowchart of a process for outputting audio output signals and haptic output signals based on a vehicle location and/or seat location data, according to embodiments of the present disclosure.

FIG. 5 is a flowchart of a process 80 for outputting audio output signals 24 and haptic output signals 26 based on a vehicle location and/or seat location data 58, according to embodiments of the present disclosure. In particular, the sensory output control system 50 may implement the process 80 to output audio output signals 24 and haptic output signals 26 based on a vehicle location and/or seat location data 58. The process 80 may be in the form of one or more software applications that include instructions that are executed by at least one suitable processor, such as the processor 54 of the controller 52 of the sensory output control system 50, via the audio adjustment logic 60 and/or the haptic adjustment logic 64. The illustrated process 80 is merely provided as an example, and in other embodiments, certain illustrated steps of the process 80 may be performed in other orders, skipped, or repeated, in accordance with the present disclosure.

As illustrated, in process block 82, the processor 54 receives a target vehicle location, input audio data 62, and input haptic data 66. The target vehicle location may correspond to a vehicle location at which the audio output signal 24 and/or the haptic output signal 26 should be output by the directional speaker 12 and/or the haptic device 14. For example, as illustrated in FIGS. 1-2, the target vehicle location may correspond to a location near the object of interest 22 in which guests in the ride vehicle 16 would be able to hear the object of interest 22. The input audio data 62 may be associated with the object of interest 22, and may be intended to be output by the directional speaker 12 when the guests are within a threshold distance (e.g., a hearing distance) of the object of interest 22. For example, the audio data 62 may simulate sounds made by the object of interest 22 (e.g., laughing, crying, shouting, stepping, shuffling, or any other suitable vocalization or movement) or sounds accompanying the object of interest 22 (e.g., music, sound effects, or any other suitable ambient noise). In the example illustrated in FIGS. 1-2, the audio data 62 may include a laughing sound associated with the clown 22. The input haptic data 66 may also be associated with the object of interest 22, and may be intended to be output by the haptic device 14 when the guests are within a threshold distance of the object of interest 22. In the example illustrated in FIGS. 1-2, the haptic data 66 may include haptic feedback associated with the object of interest 22.

In process block 84, the processor 54 receives a vehicle location (e.g., from a vehicle location sensor 20). For example, as illustrated in FIGS. 1-2, the vehicle location sensors 20 disposed on the path 18 may send indications of the vehicle location of the ride vehicle 16 to the processor 54.

In decision block 86, the processor 54 determines whether the vehicle location is approximately the same as the target vehicle location. For example, the processor 54 may determine whether the vehicle location is within a threshold distance (e.g., within a range of one inch to six feet, including one inch, six inches, one feet, two feet, or three feet) of the target vehicle location.

If not, the processor 54 returns to process block 84 to receive a next vehicle location from the vehicle location sensor 20 or another vehicle location sensor 20. If the processor 54 determines that the vehicle location is approximately the same as the target vehicle location, then, as shown in process block 88, the processor 54 receives a seat location data 58. The seat location data 58 may include a guest's seat location 28 in the ride vehicle 16, as well as the guest's preferences. For example, the guest's preferences may include a preferred language, volume level, and/or content rating.

In process block 90, the processor 54 generates an audio output signal based on the input audio data 62, the vehicle location, and/or the seat location data 58. In particular, the processor 54 may generate multiple audio output signals, each corresponding to a different seat location 28 of the ride vehicle 16 based on the input audio data 62, the vehicle location, and/or the seat location data 58. In some embodiments, the processor 54 may instruct the audio adjustment logic 60 to adjust the input audio data 62 based on the vehicle location and/or the seat location data 58. For example, the controller 52 may instruct the audio adjustment logic 60 to adjust the input audio data 62 based on the vehicle location by increasing the volume associated with the input audio data 62 as the vehicle location sensors 20 indicate that the ride vehicle 16 is nearing or getting closer to an object of interest 22. Similarly, as the vehicle location sensors 20 indicate that the ride vehicle 16 is getting further from the object of interest 22, the controller 52 may instruct the audio adjustment logic 60 to decrease the volume associated with the input audio data 62. That is, the controller 52 may instruct the audio adjustment logic 60 to adjust the input audio data 62 to simulate that the object of interest 22 is making a sound.

The controller 52 may additionally or alternatively instruct the audio adjustment logic 60 to adjust the input audio data 62 based on the seat location data 58. For example, if the seat location data 58 indicates that the guest's seat location 28 is further away from the object of interest 22 than other seats in a row of seats, the controller 52 may instruct the audio adjustment logic 60 to decrease the volume associated with the input audio data 62. Similarly, if the seat location data 58 indicates that the guest's seat location 28 is closer to the object of interest 22 than other seats in a row of seats, the controller 52 may instruct the audio adjustment logic 60 to increase the volume associated with the input audio data 62. As another example, the input audio data 62 may include multiple streams of audio data corresponding to different languages. If the seat location data 58 indicates a preferred language for the guest, the controller 52 may instruct the audio adjustment logic 60 to select the stream of audio data corresponding to the preferred language. As yet another example, if the seat location data 58 indicates a preferred volume level for the guest, the controller 52 may instruct the audio adjustment logic 60 to adjust the volume level associated with the input audio data 62 corresponding to the preferred language. In another example, the input audio data 62 may include multiple streams of audio data corresponding to different content ratings or maturity levels. If the seat location data 58 indicates a preferred content rating for the guest, the controller 52 may instruct the audio adjustment logic 60 to select the stream of audio data corresponding to the preferred content rating. Moreover, the processor 54 may instruct the audio adjustment logic 60 to adjust the input audio data 62 based on both the vehicle location and the seat location data 58. The controller 52 may then generate an audio output signal 24 based on the adjusted audio data.

In process block 92, the processor 54 generates a haptic output signal based on the input audio data 62, the vehicle location, and/or the seat location data 58. In particular, the processor 54 may generate multiple haptic output signals, each corresponding to a different seat location 28 of the ride vehicle 16 based on the input audio data 62, the vehicle location, and/or the seat location data 58. In some embodiments, the processor 54 may instruct the haptic adjustment logic 64 to adjust the input haptic data 66 based on the vehicle location and/or the seat location data 58. For example, the controller 52 may instruct the haptic adjustment logic 64 to increase a haptic output associated with the input haptic data 66 as the vehicle location sensors 20 indicate that the ride vehicle 16 is nearing or getting closer to the object of interest 22. As the vehicle location sensors 20 indicate that the ride vehicle 16 is getting further from the object of interest 22, the controller 52 may instruct the haptic adjustment logic 64 to decrease the haptic output associated with the input haptic data 66. That is, the controller 52 may instruct the haptic adjustment logic 64 to adjust the input haptic data 66 to simulate that the object of interest 22 is the cause of the haptic output. The haptic output may include any suitable output associated with the components 40 of the haptic device 14, such as outputting forces, vibrations, motions, air, water, heat, and/or cold.

The controller 52 may additionally or alternatively instruct the haptic adjustment logic 64 to adjust the input haptic data 66 based on the seat location data 58. For example, if the seat location data 58 indicates that the guest's seat location 28 is further away from the object of interest 22 than other seats in a row of seats, the controller 52 may instruct the haptic adjustment logic 64 to decrease the haptic output associated with the input haptic data 66. Similarly, if the seat location data 58 indicates that the guest's seat location 28 is closer to the object of interest 22 than other seats in a row of seats, the controller 52 may instruct the haptic adjustment logic 64 to increase the haptic output of the input haptic data 66. As another example, the seat location data 58 may include a preferred haptic level (e.g., less intense or more intense) for the guest, and the controller 52 may instruct the haptic adjustment logic 64 to adjust the haptic output associated with the input haptic data 66 to match the preferred haptic level. In yet another example, the seat location data 58 may include a preferred content rating for the guest, and the controller 52 may instruct the haptic adjustment logic 64 to adjust the haptic output associated with the input haptic data 66 to correspond to the preferred content rating. For example, if the guest is a child, the preferred content rating may correspond to the child's age or maturity level, and the controller 52 may instruct the haptic adjustment logic 64 to decrease the haptic output associated with the input haptic data 66 to decrease the intensity of the haptic output. The controller 52 may then generate a haptic output signal 26 based on the adjusted haptic data.

In process block 94, the processor 54 outputs the audio output signal 24 and the haptic output signal 26. In particular, the processor 54 may output the audio output signal 24 to a directional speaker 12 (or a set of one or more directional speakers 12) directed at the seat location 28 provided in the seat location data 58. The processor 54 may also output the haptic output signal 26 to a haptic device 14 (or a set of one or more haptic devices 14) directed at the seat location 28 provided in the seat location data 58. In one embodiment, the controller 52 may independently generate multiple audio output data signals 24 (e.g., via the audio adjustment logic 60) and multiple haptic output signals 26 (e.g., via the haptic adjustment logic 64) corresponding to multiple seats 28 of the ride vehicle 16. In this manner, each directional speaker 12 and/or each haptic device 14 directed at a respective seat location 28 (and the guest seated in the respective seat location 28) may provide customized audio (e.g., a different audio output signal 24) and/or a customized haptic experience (e.g., a different haptic output signal 26) to the respective guest as the ride vehicle 16 travels through the attraction. Additionally, the customized haptic experience may provide a more immersive environment to a guest, when compared to providing only audio and visual stimuli.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A ride vehicle system comprising:
a ride vehicle comprising:
a plurality of seats;
a plurality of directional speakers configured to provide a plurality of audio output signals, wherein each directional speaker of the plurality of directional speakers is configured to output a respective audio output signal of the plurality of audio output signals at a respective seat of the plurality of seats; and
a plurality of haptic devices configured to provide a plurality of haptic output signals, wherein each haptic device of the plurality of haptic devices is configured to output a respective haptic output signal of the plurality of haptic output signals at a respective seat of the plurality of seats; and
a control system comprising:
audio adjustment logic configured to generate each audio output signal of the plurality of audio output signals based on input audio data, a vehicle location, and seat location data associated with the respective seat, wherein the seat location data is indicative of respective distances between an object of interest and respective seats of the plurality of seats; and
haptic adjustment logic configured to generate each haptic output signal of the plurality of haptic output signals based on input haptic data, the vehicle location, the seat location data, or a combination thereof.

2. The ride vehicle system of claim 1, wherein at least some directional speakers of the plurality of directional speakers are disposed in at least some seats of the plurality of seats of the ride vehicle.

3. The ride vehicle system of claim 1, wherein at least some haptic devices of the plurality of haptic devices are disposed in at least some seats or restraints of the plurality of seats of the ride vehicle.

4. The ride vehicle system of claim 1, wherein each haptic device of the plurality of haptic devices is configured to apply a force, vibration, motion, or any combination thereof, to a guest disposed in a respective seat of the plurality of seats of the ride vehicle.

5. The ride vehicle system of claim 1, wherein each haptic device of the plurality of haptic devices comprises an actuator, a motor, an air vortex ring, an ultrasound speaker, a water jet, a heater, a chiller, a cooler, or any combination thereof.

6. The ride vehicle system of claim 1, comprising a vehicle location sensor configured to determine the vehicle location of the ride vehicle.

7. The ride vehicle system of claim 1, comprising the object of interest, wherein the object of interest comprises a physical or a virtual character at a portion of a ride experience, wherein the input audio data simulates sounds made by the object of interest, wherein the input haptic data comprises haptic feedback associated with the object of interest.

8. A control system comprising:
audio adjustment logic configured to generate each audio output signal of a plurality of audio output signals based on audio adjustment data comprising input audio data, a vehicle location of a ride vehicle, and seat location data associated with a plurality of seats of the ride vehicle, wherein the seat location data comprises respective distances between an object of interest and respective seats of the plurality of seats;
haptic adjustment logic configured to generate each haptic output signal of a plurality of haptic output signals based on haptic adjustment data comprising input haptic data, the vehicle location, the seat location data, or a combination thereof; and a controller comprising a processor and a memory device, wherein the processor is configured to:
receive the audio adjustment data and the haptic adjustment data;
instruct the audio adjustment logic to generate the plurality of audio output signals based on the audio adjustment data;
instruct the haptic adjustment logic to generate the plurality of haptic output signals based on the haptic adjustment data;
output a respective audio output signal of the plurality of audio output signals to a respective directional speaker of a plurality of directional speakers directed at a respective seat of the plurality of seats of the ride vehicle; and
output the plurality of haptic output signals to a plurality of haptic devices directed at the plurality of seats of the ride vehicle.

9. The control system of claim 8, wherein the audio adjustment logic is configured to generate each audio output signal based on adjusting a volume level associated with the input audio data, wherein the volume level is adjusted based on the vehicle location.

10. The control system of claim 8, wherein the haptic adjustment logic is configured to generate each haptic output signal based on adjusting an intensity associated with the input haptic data, wherein the intensity is adjusted based on the vehicle location.

11. The control system of claim 8, wherein the audio adjustment logic is configured to generate the respective audio output signal based on adjusting a volume level associated with the input audio data based on a respective distance between the object of interest and the respective seat of the plurality of seats of the ride vehicle.

12. The control system of claim 11, wherein the audio adjustment logic is configured to generate an additional audio output signal of the plurality of audio output signals based on adjusting the volume level associated with the input audio data based on a respective distance between the object of interest and an additional seat of the plurality of seats of the ride vehicle, wherein the processor is configured to output the additional audio output signal of the plurality of audio output signals to an additional directional speaker of the plurality of directional speakers directed at the additional seat of the plurality of seats of the ride vehicle.

13. The control system of claim 8, wherein the seat location data comprises respective preferred volume levels input by respective guests of the respective seats of the plurality of seats, wherein the audio adjustment logic is configured to generate the respective audio output signal based on adjusting a volume level associated with the input audio data based on a respective preferred volume level and a respective distance between the object of interest and the respective seat of the plurality of seats of the ride vehicle.

14. The control system of claim 8, wherein the seat location data comprises respective preferred languages for respective guests of the respective seats of the plurality of seats, wherein the input audio data comprises a plurality of streams of audio data corresponding to different languages, wherein the audio adjustment logic is configured to generate the respective audio output signal based on selecting a stream of audio data of the plurality of streams of audio data corresponding to a respective preferred language.

15. The control system of claim 8, wherein the seat location data comprises respective content ratings for respective guests of the respective seats of the plurality of seats, wherein the input audio data comprises a plurality of streams of audio data corresponding to different content ratings, wherein the audio adjustment logic is configured to generate the respective audio output signal based on selecting a stream of audio data of the plurality of streams of audio data corresponding to a respective content rating.

16. The control system of claim 11, wherein the processor is configured to output a respective haptic output signal of the plurality of haptic output signals to a respective haptic device of the plurality of haptic devices directed at the respective seat of the plurality of seats of the ride vehicle, wherein the haptic adjustment logic is configured to generate the respective haptic output signal based on adjusting an intensity associated with the input haptic data based on the respective distance between the object of interest and the respective seat of the plurality of seats of the ride vehicle.

17. A method for providing an immersive ride vehicle environment comprising:
receiving, at one or more processors, audio data, haptic data, a vehicle location of a ride vehicle, and seat location data associated with a plurality of seats of the ride vehicle, wherein the seat location data is indicative of respective distances between an object of interest and respective seats of the plurality of seats;
generating, using the one or more processors, each audio output signal of a plurality of audio output signals based on the audio data, the vehicle location, and the seat location data;
generating, using the one or more processors, each haptic output signal of a plurality of haptic output signals based on the haptic data and at least the vehicle location or the seat location data;
outputting, using the one or more processors, a respective audio output signal of the plurality of audio output signals to a respective directional speaker of a plurality of directional speakers of the ride vehicle directed at a respective seat of the plurality of seats; and
outputting the plurality of haptic output signals to a plurality of haptic devices of the ride vehicle directed at the plurality of seats.

18. The method of claim 17, comprising:
receiving, using the one or more processors, a target vehicle location; and
outputting, using the one or more processors, the plurality of audio output signals to the plurality of directional speakers and outputting the plurality of haptic output signals to the plurality of haptic devices in response to determining that the vehicle location is approximately the same as the target vehicle location.

19. The method of claim 17, wherein generating, using the one or more processors, the respective audio output signal comprises adjusting a volume level associated with the audio data based on a respective distance between the object of interest and the respective seat of the plurality of seats.

20. The method of claim 19, wherein outputting, using the one or more processors, the plurality of haptic output signals comprises outputting a respective haptic output signal of the plurality of haptic outputs signals to a respective haptic device of the plurality of haptic devices directed at the respective seat of the plurality of seats, wherein generating, using the one or more processors, the respective haptic output signal comprises adjusting an intensity associated with the haptic data based on the respective distance between the object of interest and the respective seat of the plurality of seats.

* * * * *